Oct. 3, 1967     M. SLAVIN ETAL     3,345,551
VARIABLE SPEED CONTROL FOR A DC MOTOR
Filed May 10, 1966
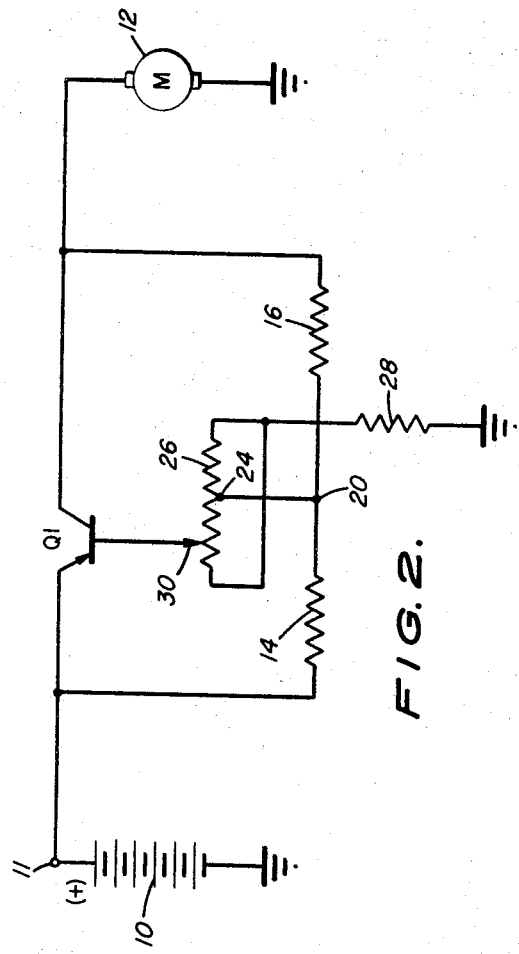
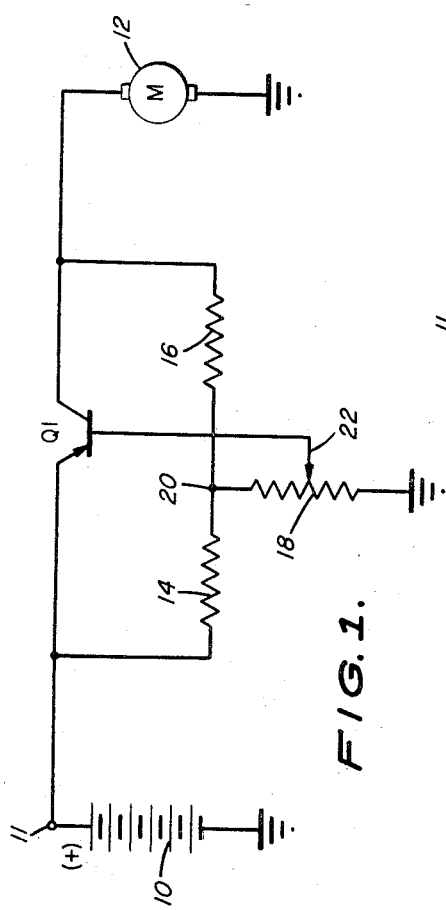
MICHAEL SLAVIN
GRAYSON B. MORRIS, Jr.
                INVENTORS
BY *Killman & Lamb*
                  ATTORNEYS

United States Patent Office 3,345,551
Patented Oct. 3, 1967

3,345,551
VARIABLE SPEED CONTROL FOR A DC MOTOR
Michael Slavin and Grayson B. Morris, Jr., Baltimore, Md., assignors to The Bendix Corporation, a corporation of Delaware
Filed May 10, 1966, Ser. No. 548,901
3 Claims. (Cl. 318—345)

This invention relates to the regulation of electric motor speed and more particularly to an improved transistorized circuit for controlling the speed of a direct current motor.

The problems of the relation of component size to energy dissipation and of transistor protection in motor control circuits has been recognized and attempts to solve these problems by shunting a portion of the line current away from the transistor emitter-collector path by connecting a resistor in parallel therewith are not new. In these attempts, however, the prior art has found it necessary to resort to a common collector transistor configuration with the attendant problem of power dissipation in the transistor conduction controlling resistor. In addition to the obvious inefficiency resulting from diverting power away from the motor, this dissipation of energy in the form of heat requires larger components than would otherwise be required. Similarly, an emitter resistor has been necessary in order to utilize the common emitter configuration but the power dissipation due to line current flowing therethrough has been excessive. It is accordingly an object of the invention to provide an improved speed control circuit for a DC motor.

Another object is to provide a motor control circuit wherein a transistor can be operated in a common emitter configuration without the use of an emitter resistor. Another object is to provide a motor control circuit wherein the controlling transistor operates with very nearly zero power dissipation at normal equilibrium conditions.

Still another object is to provide a motor control circuit which will remain operative in the event of transistor failure.

Yet another object is to provide a reliable and economical motor control circuit wherein miniaturization of components is feasible.

For ease of explanation only, the circuit of the present invention will be hereinafter described in relation to the control system of an automobile heater-air conditioner blower motor.

The accompanying drawings illustrate schematically two embodiments of the circuit of the present invention in which:

FIG. 1 shows a circuit adapted for an automobile heater blower motor control; and FIG. 2 shows a circuit adapted for a combined control of an automobile heater and air conditioner blower motor.

Referring now to FIG. 1, a source of power, ordinarily the automobile battery 10 is connected to terminal 11 for supplying current to motor 12 through the variable impedance emitter-collector path of transistor Q1 and through a parallel path comprising the series connected resistors 14 and 16. A potentiometer 18, connected between the junction point 20 of resistors 14 and 16 and ground, supplies at its arm 22 an adjustable base bias for transistor Q1. The motor 12 may suitably be of the type having a permanent magnet field. The values of the resistors 14 and 16 are chosen such that when the transistor Q1 is nonconducting or nearly so, the motor 12 will receive sufficient current therethrough to operate at a desired minimum speed. This permits transistor Q1 to operate with very low power dissipation under normal equilibrium conditions, e.g. after the temperature of the automobile once attains the desired value and the blower runs at low speed.

The resistance of potentiometer 18 is several times larger than that of resistor 16 so that the current from point 20 through potentiometer 18 to ground is several times smaller than that from point 20 through resistor 16 to motor 12.

As is readily apparent, assuming for the moment that the base electrode of transistor Q1 is directly connected to point 20 by the variable arm 22 of potentiometer 18, the voltage at point 20 determines both the state of conduction of transistor Q1 and the current through resistor 16 which determines minimum blower motor speed. The value of resistor 14 is chosen so that the voltage at point 20 is sufficient to bias the base electrode of transistor Q1 for very low or non-conduction through the emitter-collector path of the transistor.

The movement of arm 22 may be manually controlled from the automobile dashboard. Movement of the arm towards ground decreases the voltage applied to the base electrode of transistor Q1 and thus increases its conduction. Transistor Q1 will be operating in the fully saturated region when arm 22 is at the lower or low voltage extremity of potentiometer 18. In the absence of an emitter resistor, circuit stabilization is provided for temperature, voltage and transistor variations by the collector feedback path through resistor 16.

Since the total resistance of parallel paths is less than that of either path alone, the operation of transistor Q1 in the fully saturated region insures that there will be only a minimum of resistance between terminal 11 and motor 12. Under these conditions, the presence of an emitter resistor would result in excessive power dissipation therein due to the large current flow.

An alternative embodiment of the present is shown in FIG. 2. This embodiment is specifically adapted for control of the blower motor in an automatically controlled heater and air conditioner. In this embodiment the midpoint 24 of potentiometer 26 is connected to point 20 and the ends are connected together and to the ungrounded end of resistor 28.

As in the embodiment of FIG. 1, the total resistance from point 20 to ground is a fixed value but now includes the parallel current paths from mid-point 24 to the extremities of potentiometer 26 in series with resistor 28.

With the variable arm 30 of potentiometer 26 positioned at midpoint 24, the voltage applied to the base electrode of transistor Q1 will be that of point 20 and a maximum. Movement of arm 30 away from mid-point 24 in either direction will result in lowering the voltage applied to the base electrode and will thus increase the conduction of transistor Q1 as previously explained in conjunction with the operation of FIG. 1.

This modification is particularly suited to use in heater-air conditioner systems in which the temperature is adjusted by blending hot and cold air streams by means of a damper door. The arm of potentiometer 26 may be mechanically connected to the damper so that in one extreme position of the damper, say one in which the hot air is blocked, the blower motor will run at maximum speed. In the other extreme position of the damper the cold air will be blocked and the blower motor will also run at maximum speed. The blower speed will be reduced for intermediate positions of the damper.

Many modifications and variations of the invention will be readily apparent to those skilled in the art. Among the most obvious will be the adaptation of the circuit for use of an NPN transistor. The embodiments shown and described above are to be considered as illustrative only and not as limiting the invention which is defined by the scope of the appended claims as interpreted with a view toward suitable alternatives and equivalents.

The invention claimed is:
1. A control circuit for adjusting the speed of a direct current motor in a continuous manner comprising:
   a first terminal;
   a two pole direct current source having one pole connected to said first terminal and the other pole grounded;
   a second terminal;
   a motor connected between said second terminal and ground;
   a transistor having collector, emitter and base electrodes, the emitter-collector path of said transistor directly connecting said first and second terminals;
   a third terminal;
   a first resistor connected between said first and third terminals;
   a second resistor connected between said second and third terminals; thereby providing a path including said first and second resistors in parallel with the emitter-collector path of said transistor; and
   variable resistance means connected between said third terminal and ground and having a connection to the base electrode of said transistor to vary the bias of said base electrode and thereby vary the current to said motor.

2. A circuit as claimed in claim 1 wherein said variable resistance means comprises a potentiometer having an adjustable arm electrically connected to said transistor base electrode.

3. A circuit as claimed in claim 1 wherein said variable resistance means comprises a potentiometer having a resistance element with a fixed tap intermediate the ends of said element, and an arm adjustable along the length of said element, the element ends being connected together and to ground, said tap being connected to said third terminal and said arm being connected to said transistor base electrode.

References Cited
UNITED STATES PATENTS

| | | | |
|---|---|---|---|
| 2,975,349 | 3/1961 | Green | 318—331 |
| 3,084,319 | 4/1963 | Hooijkamp. | |
| 3,143,695 | 8/1964 | Hohne et al. | 318—345 X |
| 3,202,898 | 8/1965 | Genning et al. | 318—325 |

ORIS L. RADER, *Primary Examiner.*

J. C. BERENZWEIG, J. J. BAKER, *Assistant Examiners.*